Jan. 1, 1929.
A. G. COUTU
1,697,384
TOASTER OR THE LIKE
Filed Dec. 9, 1927   2 Sheets-Sheet 1
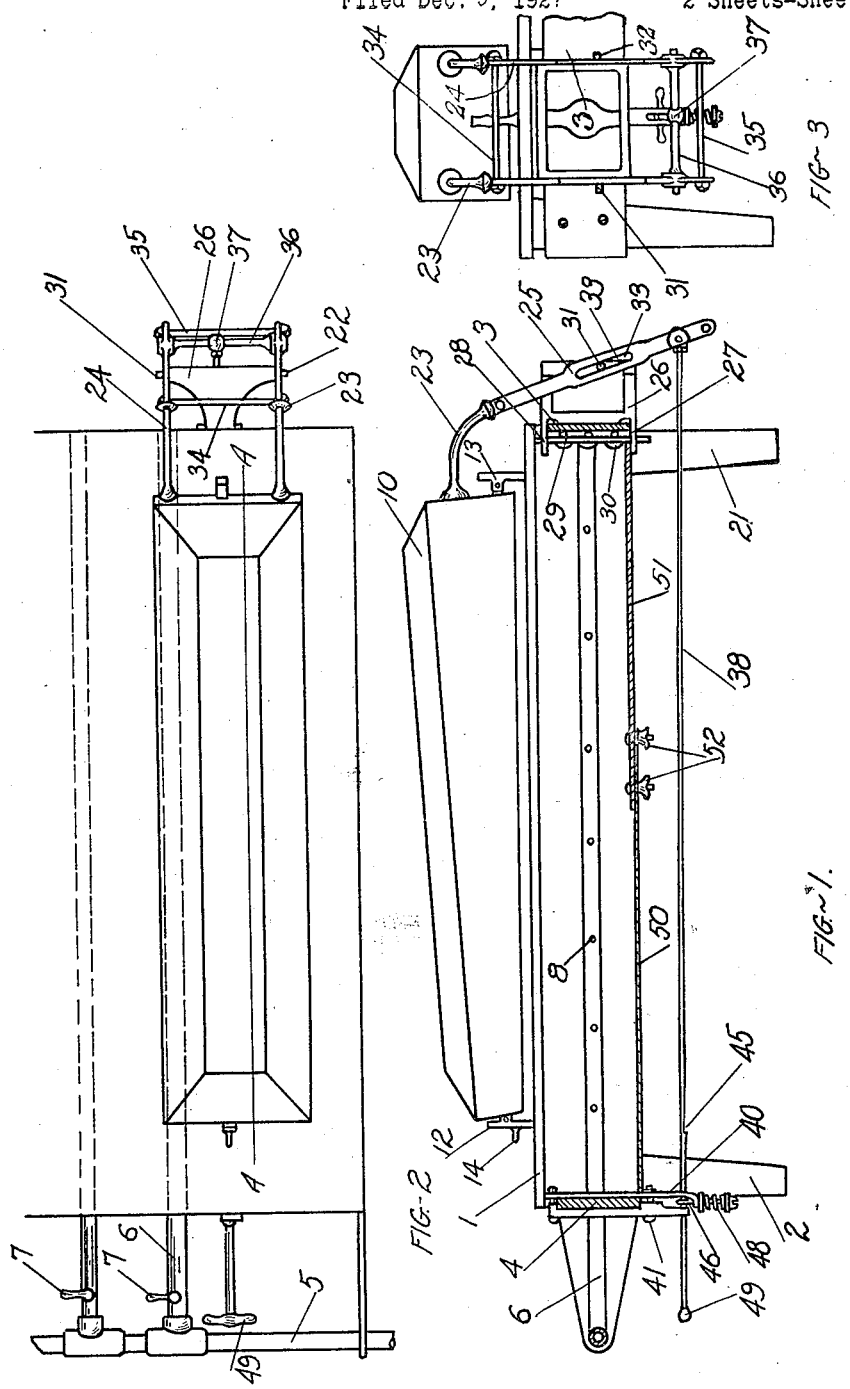
Inventor:
ARTHUR G. COUTU
by Manuel C. Rosa
atty.

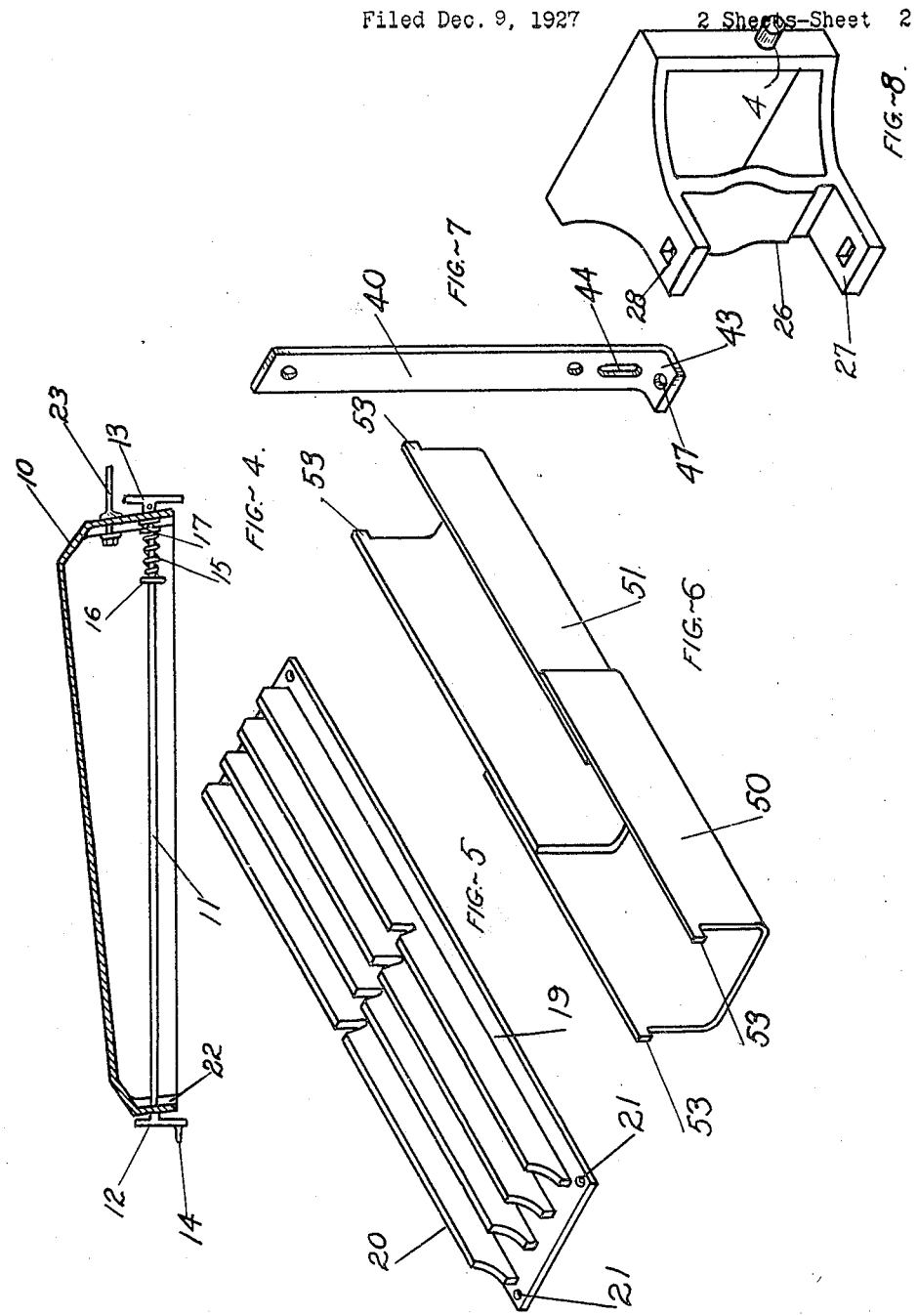

Patented Jan. 1, 1929.

1,697,384

UNITED STATES PATENT OFFICE.

ARTHUR G. COUTU, OF FALL RIVER, MASSACHUSETTS.

TOASTER OR THE LIKE.

Application filed December 9, 1927. Serial No. 238,857.

My invention relates to an attachment for the conventional griddle employed in restaurants for preparing frankfurters, griddlecakes, toast or other food stuffs which when used during the toasting of bread is particularly suited to accelerate the toasting of the same.

In ordinary practice where bread is toasted by laying it on a heated surface, the toasting requires several minutes as the bread must be turned over in order to make the toasting uniform. I have found that where a presser member is used which presses the bread against the heated surface that the toasting operation is greatly speeded up. The efficacy of the presser member is greatly enhanced where the presser member is preheated as from contacting the hot surface during the time when it is not in use. By using the presser member, as I will hereinafter describe, the amount of time to toast bread is reduced to less than one half of that required ordinarily.

It is an object of my invention to provide a toaster which is simple in structure and reliable in operation.

Another object of my invention is to provide a toaster which comprises a presser unit attached to an ordinary griddle surface, the substance to be toasted being disposed on the griddle surface beneath said presser unit.

Another object of my invention is to provide a toaster wherein bread or sandwiches may be toasted on the same surface with other food stuffs and materials.

Other objects and advantages will appear from the detailed description which follows.

I attain these objects and advantages by means of the mechanism illustrated in the drawings wherein:

Figure 1 is a cross sectional view of a griddle showing the presser unit in elevation.

Figure 2 is a plan view of a portion of the griddle surface showing the presser unit resting thereon.

Figure 3 is a rear elevational view showing the bracket to which the presser unit is attached.

Figure 4 is a cross sectional view taken through the presser member with the bottom removed showing the means for spacing the presser member above the griddle surface.

Figure 5 is a perspective view showing the bottom part of the presser member.

Figure 6 is a perspective view of the trough member which incloses the gas jets and is disposed below the griddle surface, a position corresponding to that occupied by the presser member above the griddle surface.

Figure 7 is a detailed view of the strap member having a slot which serves as an anchor for holding the presser unit in an inoperative position.

Figure 8 is a perspective view of the bracket member.

Similar numerals refer to similar parts throughout the several views.

Referring to the drawings, 1 is an ordinary griddle surface which may be made of sheet steel or any other suitable material. The surface is suitably mounted as on standards 2. The sides 3 and 4 are secured to the standards 2. The main gas line 5 and the branch gas line 6 with the key 7 are provided as shown in the drawings. The gas line 7 is provided with openings or jets 8 by means of which the surface 1 is heated. As the structure of the ordinary griddle is well known, further discussion of its construction is unnecessary.

The presser member 10 has a width sufficient to cover the bread to be toasted and is of sufficient length to operate on several pieces at the same time. As shown in Figure 4, the presser member is hollow within and has the longitudinal rod 11 passing from one end to the other and having the gauge members 12 and 13 at the ends of said rod exterior of the ends of the presser member. The gauge member 12 is provided with a handle 14 by means of which it may be operated. The gauge members are adapted to hold the said presser member in spaced relation from the griddle surface during the toasting operation being provided with different lengths on each side of the rod 11 so that two different heights are obtainable. It will be appreciated also that the gauge members may be turned so as to allow the presser member to be flush with the griddle surface. A compression spring 15 is disposed at one end of the rod 11 so as to prevent the rod 11 from freely rotating. The spring is disposed between the washers 16 and 17, the washer 16 being held against movement on the rod 11 by a cotter pin. The bottom 19 of the presser member 10 is shown in Figure 5 and consists of a sheet surface having the longitudinal ribs 20, screw openings 21 are provided whereby the same may be secured to the presser member by means of threaded openings in the ear portions 22 in the corners of the presser member.

The means for operating the presser member comprises the arms 23 and 24 which are secured to the presser member as shown in Figure 2. The arms 23 and 24 are bent as shown in Figure 1 and are each provided with an enlarged portion 25. A bracket 26 is provided with top and bottom extensions 27 and 28 which inclose the side 3, said extensions having aligned openings disposed on the interior side of the side 3. A joining member 29 passing through said openings is provided with threaded openings to receive the bolts 30. It will be appreciated that by turning the bolts 30 that the bracket 26 is securely clamped against the side 3 of the griddle machine. The sides of the bracket 26 are provided with pintle means 31 and 32 which are adapted to fit within a slot 33 provided in each of the enlarged portions 25 of the arms 23 and 24. The arms 23 and 24 are joined together by the tie rods 34 and 35. Disposed above the tie rod 35 and mounted for rotation is the axle member 36 having the enlarged portion 37 at its mid portion. The lever rod 38 is secured to the mid portion 37 of the axle member by threading its end into a threaded opening provided in said enlarged portion.

Secured to the side 4 of the griddle machine is the strap 40 which is secured as shown in Figure 1 by means of bolts passing between a companion member 41 on the other side of the side 4. The lower extremity of the strap 40 is turned at a right angle to form a flange 43 as shown in Figure 7. A slot 44 is provided in the member 40 just above the flange 43 through which the lever rod 38 is adapted to slide, the notch 45 of the lever rod being adapted to grip the edge of the slot to hold the presser member in a raised position. An eye bolt 46 passes through the hole 47 in the flange 43 and is provided with a helical spring 48. The lever rod 38 passes through the loop portion of the eye bolt and the loop is urged downwardly, by reason of the spring, to maintain the notch 45 in a gripping position. A handle 49 is provided at the outer extremity of the lever rod 38 for the manipulation of the same. By pulling the rod outwardly the presser member is raised and upon the notch 45 passing the slot 44 the lever rod is held against slippage while the presser member remains raised. The lever rod is readily released by lifting the notch portion out of engagement with the slot.

Positioned on the under side of the griddle surface, in a position corresponding to that of the presser member above the griddle surface, is the heat confining trough which comprises the companion members 50 and 51 having coinciding slots on their overlapping bottoms to allow adjustment as to length by means of the bolt and wing nuts 52. The members 50 and 51 are provided with lugs 53 to their outermost corners which overhang the sides 3 and 4 of the griddle unit whereby the trough is held in place. By means of this trough it will be appreciated that the heat generated by the jets within the trough will be more or less restricted to the area of the griddle upon which the bread and sandwiches are toasted without causing undue heating of the remaining surface of the griddle. A further advantage is that it will not unnecessarily heat the other pipes containing the gas jets so as to cause difficulty in the lighting of the same.

The mode of operation of the improved toaster is apparent from an inspection of the drawings. When it is desired to simply use the griddle surface for the roasting of frankfurters or the preparing of eggs or other similar food stuffs, the toasting attachment may be thrown out of operation by engaging the notch 45 in the slot 46. However, where it is desired to toast bread or sandwiches simultaneously with the preparation of other foods this may be done by lowering the presser member and by reason of the gauge means at each end the presser member may be spaced from the hot plate the distance of a slice of bread or that of a sandwich. When the presser member is not in use it is preferable to turn the gauge member so that it may rest flush on the hot plate and it will be appreciated that the bottom of the presser member will become heated by contact with the hot plate upon which other food stuffs are intermittently being prepared. By thus preheating the presser member the toasting operation is greatly accelerated when the presser member is eventually used. Although the toasting operation is primarily influenced by the pressure imposed by the presser member a further advantage is obtained by preheating the presser member.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure which utilize the principle of my invention and fall within the purview of my invention and are within the spirit and scope of the following claims.

The invention having been set forth, what is claimed as new and useful is:—

1. In combination with the hot plate of a griddle device, a presser member of sufficient width and length to cover a portion of said plate, a bracket on said griddle device, arms secured to said presser member and being slidably secured to said bracket, a lever rod connected to said arms and extending to the other end of said griddle device, said lever rod being adapted to raise and lower said presser member, and means for holding said presser member in a raised position.

2. In the structure set forth in claim 1, said presser member comprising a hollow box-like body having a removable bottom portion, said bottom portion having longitudinal spaced ribs on the interior thereof, and gauge means at each end of said presser member for spacing said presser member above said hot plate.

3. In combination with the hot plate of a griddle device, a presser member of sufficient width and length to cover a portion of said plate, a bracket on said griddle device, arms secured to said presser member and being slideably secured to said bracket, a lever rod connected to said arms and extending to the other end of said griddle device, said lever rod being adapted to raise and lower said presser member, and means for holding said presser member in a raised position, said means comprising an angle member secured to the front side of said griddle device having a slot at its lower extremity, said lever rod being adapted to pass through said slot, said lever rod having a notch in its portion adjacent said front side, said notch being adapted to engage the edge of said slot, and resilient means for holding said notch in engagement with said slot.

4. In combination with a griddle device having a hot plate, standards, sides, and heating means, a presser member, said presser member comprising a box-like body having a removable bottom portion, said bottom portion having longitudinal spaced ribs on the interior thereof, a rod passing through the ends of said presser member and having gauge members at its ends for spacing said presser member from said hot plate a predetermined distance, said presser member being adapted to rest flush on said hot plate if desired, and means associated with said griddle device for raising and lowering said presser member.

5. In combination with the hot plate of a griddle device, having standards, sides, and heating means, a hollow box-like presser member of sufficient width and length to cover a portion of said plate, a bracket secured to said griddle device, pintles on the sides of said bracket, arms secured to said presser member and having slots therein for receiving said pintles whereby said arms are slideably secured to said bracket, tie rods securing said arms together, an axle member disposed between said arms and journaled therein, a lever rod secured to said axle members and extending to the other end of said griddle device, said lever rod being adapted to raise and lower said presser member, and means for holding said presser member in a raised position.

6. In combination with the hot plate of a griddle device, having standards, sides and heating means, a hollow box-like presser member of sufficient width and length to cover a portion of said plate, a bracket secured to said griddle device, pintles on the sides of said bracket, arms secured to said presser member and having slots therein for receiving said pintles whereby said arms are slideably secured to said bracket, tie rods securing said arms together, an axle member disposed between said arms and journaled therein, a lever rod secured to said axle members and extending to the other end of said griddle device, said lever rod being adapted to raise and lower said presser member, and means for holding said presser member in a raised position, said means comprising an angle member secured to the front side of said griddle device having a slot at its lower extremity, said lever rod being adapted to pass through said slot, said lever rod having a notch in its portion adjacent said front side, said notch being adapted to engage the edge of said slot, and resilient means for holding said notch in engagement with said slot, said hollow box-like presser member having a removable bottom portion, said bottom portion having longitudinal spaced ribs on the interior thereof, and gauge means at each end of said presser member for spacing said presser member above said hot plate.

Signed at Fall River in the county of Bristol, State of Massachusetts this first day of December, 1927.

ARTHUR G. COUTU.